(12) United States Patent
Rao et al.

(10) Patent No.: US 12,549,691 B2
(45) Date of Patent: Feb. 10, 2026

(54) VIDEO SURVEILLANCE SYSTEM WITH ENHANCED CAMERA WAKE-UP BASED ON RADAR DATA

(71) Applicant: TEXAS INSTRUMENTS INCORPORATED, Dallas, TX (US)

(72) Inventors: Sandeep Rao, Bangalore (IN); Manu Mathew, Bangalore (IN); Nathan Block, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/646,257

(22) Filed: Apr. 25, 2024

(65) Prior Publication Data

US 2025/0203048 A1 Jun. 19, 2025

(30) Foreign Application Priority Data

Dec. 14, 2023 (IN) .............................. 202341085335

(51) Int. Cl.
*H04N 7/18* (2006.01)
*G01S 13/86* (2006.01)
*G06T 7/246* (2017.01)
*H04N 23/65* (2023.01)

(52) U.S. Cl.
CPC .......... *H04N 7/188* (2013.01); *G01S 13/867* (2013.01); *G06T 7/248* (2017.01); *H04N 7/183* (2013.01); *H04N 23/65* (2023.01); *G06T 2207/10028* (2013.01); *G06T 2207/30196* (2013.01); *G06T 2207/30232* (2013.01)

(58) Field of Classification Search
CPC ........ H04N 7/188; H04N 7/183; H04N 23/65; G06T 7/248; G01S 13/867
See application file for complete search history.

(56) References Cited

U.S. PATENT DOCUMENTS

2024/0203222 A1* 6/2024 Amir ................ G08B 13/19613
2025/0130325 A1* 4/2025 Kong ...................... G01S 13/89

OTHER PUBLICATIONS

"Using 60-GHz radar sensors in video doorbells" video, found at https://www.youtube.com/watch?v=srLBuHDuiEs, Jan. 3, 2023.

* cited by examiner

*Primary Examiner* — Kathleen V Nguyen
(74) *Attorney, Agent, or Firm* — Michael T. Gabrik; Frank D. Cimino

(57) ABSTRACT

Various embodiments of the present disclosure relate to video surveillance systems, and in particular, to determining when to wake-up a camera based on gathered radar data. In an example embodiment a system including transceiver circuitry and processing circuitry is provided. The transceiver circuitry is configured to transmit and receive radar signals. The processing circuitry is coupled with the transceiver circuitry and is configured to generate point cloud data associated with a scene and obtain a radar-space region of interest (ROI) based on the point cloud data. Further, the processing circuitry is configured to identify a location of an object moving in the scene based at least on a radar signal received by the transceiver circuitry. The processing circuitry is also configured to determine to wake-up a camera based on the location of the object in the scene and the radar-space ROI.

20 Claims, 12 Drawing Sheets

VIDEO SURVEILLANCE SYSTEM WITH ENHANCED CAMERA WAKE-UP BASED ON RADAR DATA

CROSS-REFERENCE TO RELATED APPLICATION

This application is related to, and claims the benefit of priority to, India Provisional Patent Application No. 202341085335, filed on Dec. 14, 2023, and entitled "2D-3D Boundary Estimation Using Radar and Camera", which is hereby incorporated by reference in its entirety.

TECHNICAL FIELD

This disclosure relates generally to computing hardware and software and, in particular, to video surveillance systems.

BACKGROUND

Video surveillance systems represent a type of surveillance technology used to prevent intruders, theft, and other dangers of the like. For example, such systems may include video doorbell systems which monitor for movement outside a user's front porch. Typically, video surveillance systems include a radar which continuously monitors for movement within a designated region of interest (ROI), and a camera which is woken up by the radar when movement is detected within the designated ROI. The designated ROI is representative of a section within an environment in which a user desires protection. When movement is detected within the designated ROI the radar alerts the camera to begin recording.

Generally, the user designates the ROI within the 2-dimensional (2D) image-space. For example, the camera may display an image to a user and the user indicates where, within the image-space, they desire surveillance. In another example, the user may be presented with a satellite image of the respective environment, and the user may designate where, within the satellite image-space, they desire surveillance. Once designated, the video surveillance system converts the 2D image coordinates of the user designated ROI, herein referred to as the image-space ROI, into coordinates which may be interpreted by the radar (i.e., 3-dimensional (3D) real-world coordinates).

Typical methods for converting 2D image coordinates of the image-space ROI into 3D real-world coordinates require a secondary camera. For example, some methods employ a moving camera to capture the depth of an environment, while other methods utilize satellite images which depict a bird's-eye view of the environment. Problematically, these methods can be expensive, and may require a user to share their location with a third party.

SUMMARY

Disclosed herein is technology, including systems, methods, and devices that leverage data collected by a radar, herein referred to as point cloud data, to produce a region of interest (ROI) that is monitored for the purposes of waking up a camera.

In one example embodiment, a system includes processing circuitry coupled with transceiver circuitry. The processing circuitry is configured to generate point cloud data associated with a scene and obtain a radar-space region of interest (ROI) based on the point cloud data. The transceiver circuitry is configured to transmit and receive radar signals. In an implementation, the processing circuitry receives radar signals from the transceiver circuitry to identify a location of an object moving within the scene and to determine when to wake-up a camera. The processing circuitry may determine when to wake-up the camera based on the location of the object within the scene and the radar-space ROI.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
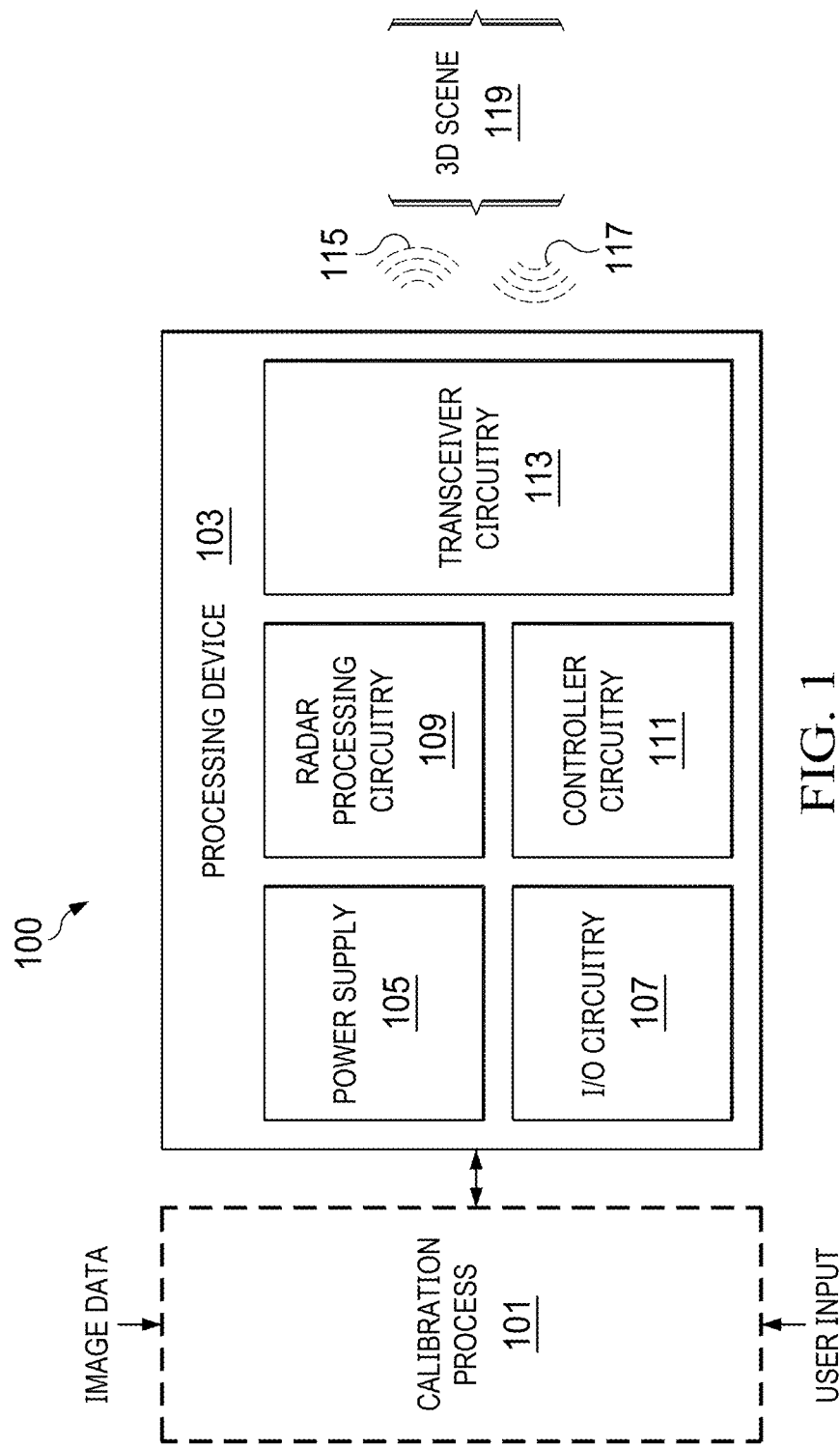
FIG. 1 illustrates an operating environment in an implementation.

Technology is disclosed herein which provides an enhanced camera wake-up for video surveillance systems that employ radar detection methodologies. The term "wake-up" as used herein includes turning on, activating, or otherwise transitioning the camera from an off, low power or sleep state to an operative state. For example, such systems may include a video doorbell system which employs both a camera and a radar for detecting movement within a designated region of interest (ROI). For the purposes of explanation, video doorbell systems will be discussed herein. This is not meant to limit the applications of the proposed technologies, but rather to provide an example. Other applications may include residential security systems or commercial security systems which require video surveillance.

Generally, video surveillance systems include a radar which continuously monitors for movement in a designated ROI and a camera which is awoken by the radar when movement is detected in the designated ROI. The designated ROI is representative of a section within a scene in which a user desires surveillance, such that the scene is representative of the environment which is being monitored by the video surveillance system. Typically, the user designates the ROI within the 2-dimensional (2D) image-space. For example, the camera may present an image of the scene to the user, and the user may designate where in the image they desire protection. As such, the user designates the ROI in the 2D image-space, but to be actionable to the radar, the 2D image coordinates of the image-space ROI must be converted to 3-dimensional (3D) real-world coordinates.

Existing techniques for converting 2D image coordinates into 3D real-world coordinates rely on a secondary camera. For example, some systems utilize a satellite camera to provide a bird's-eye view of the respective scene. In contrast, disclosed herein is a new technique for converting 2D image coordinates into 3D real-world coordinates which relies on a singular stationary camera and is based on the ground plane depicted by the image.

In one example embodiment, a calibration process for determining an equation for the ground plane of an image is provided. The ground plane of an image is a horizontal plane which is representative of the ground on which an object is presumed to be placed. The ground plane equation is a formula for representing the dimensions of the ground plane. In an implementation, the calibration process is representative of a process for determining how to accurately convert 2D image coordinates into 3D real-world coordinates based on the ground plane equation of an image.

To begin the calibration process, a video surveillance system which includes processing circuitry coupled to transceiver circuitry generates multiple radar detection points associated with an object moving through a scene. In an implementation, the video surveillance system opportunistically generates the multiple radar detection points, herein referred to as point cloud data. For example, the video surveillance system may generate the point cloud data when a person happens to walk through the scene. In another implementation, the video surveillance system intentionally generates the point cloud data. For example, the video surveillance system may run a calibration routine during the device setup where a person intentionally walks through the scene and the video surveillance system gathers the point cloud data.

Next, the processing circuitry of the video surveillance system determines the ground plane equation for the image based on the gathered point cloud data. Additionally, the processing circuitry may utilize data collected by a camera and other image processing algorithms to determine the ground plane equation. In an implementation, the processing circuitry requires multiple instances of the point cloud data to determine the ground plane equation. For example, the processing circuitry may require at least three separate instances of point cloud data to determine the ground plane equation.

After calibration of the video surveillance system, a user may designate an ROI in which they desire surveillance. The user designates the ROI within the image-space, and in response, the processing circuitry converts the 2D image coordinates of the image-space ROI into 3D real-world coordinates based on the ground plane equation. As a result, the processing circuitry produces a radar-space ROI. In some implementations, the radar-space ROI may be described using the 3D coordinates of a group of points on the ground plane that together define the image-space ROI. For example, if the image-space ROI is defined by a polygon on the ground plane, then the radar-space ROI includes the 3D coordinates which describe the vertices of the polygon. In operation, the radar of the video surveillance system sends out radar signals to detect movement within the radar-space ROI. If movement is detected within the radar-space ROI, then the processing circuitry alerts the camera to wake up and begin recording, else the camera remains in an off-state.

Advantageously, the proposed technology allows a user to designate an ROI with 3D real-world coordinates without the use of a secondary camera. As such, the proposed solution is less expensive than applications that require a secondary camera. Furthermore, the proposed solution enhances the user experience. For example, existing techniques which utilize satellite imagery require the user to designate the image-space ROI from the bird's-eye view perspective. In contrast, the proposed technology allows the user to designate the image-space ROI from the perspective captured by the camera of the video surveillance system. In many cases, the perspective of the camera is akin to the user's perspective, especially when the camera is oriented in a front-facing direction similar to that of a user looking outward into a front yard or other such environment. In addition, the proposed solution does not require interactions with satellite image providers since an overhead image is not needed. Thus, potential errors and other such hassles involved with overhead imagery are avoided.

Turning to the figures, FIG. 1 illustrates operating environment 100 in an implementation. Operating environment 100 is representative of an example operating environment configurable to determine when to wake-up a camera based on received radar data. Operating environment 100 includes calibration process 101, processing device 103, radar signal 115, radar signal 117, and 3D scene 119.

Calibration process 101 is representative of software, that when executed, causes the executing device to determine the radar-space region of interest (ROI) of a respective image. For example, processing device 103 may execute calibration process 101 to determine the radar-space ROI of an image which depicts 3D scene 119. The radar-space ROI is representative of a user designated section of an environment in which they request surveillance by radar. For example, the radar-space ROI may be representative of a section within 3D scene 119 in which the user desires surveillance by processing device 103. In some implementations, the radar-space ROI may be described using 3D real-world coordinates corresponding to a group of points on the ground plane that together define the image-space ROI. For example, if the image-space ROI is defined by a line on the ground plane, then the radar-space ROI may comprise the 3D real-world coordinates which correspond to the line. Inputs to calibration process 101 include radar data, image data, and user input, and the output of calibration process 101 includes the radar-space ROI.

Processing device 103 is representative of one or more circuits capable of executing program instructions. For example, processing device 103 may execute calibration process 101. In the context of video surveillance applications, processing device 103 is representative of a radar subsystem. In an implementation, processing device 103 is employed to collect the radar data for performing calibration process 101. Additionally, processing device 103 may be employed to detect motion within the radar-space ROI. Processing device 103 includes, but is not limited to, power supply 105, input/output (I/O) circuitry 107, radar processing circuitry 109, controller circuitry 111, and transceiver circuitry 113.

Power supply 105 is representative of circuitry configured to provide power to the circuitries of processing device 103. Power supply 105 includes multiple power supply rails for providing various levels of power to the circuitries of processing device 103. For example, power supply 105 may include a 1.2 voltage supply rail, a 1.8 voltage supply rail, and a 3.3 voltage supply rail.

I/O circuitry 107 is representative of circuitry configured to provide input pins and output pins to processing device 103. For example, an external device may deliver signals to processing device 103 via I/O circuitry 107. In an implementation, I/O circuitry 107 includes, but is not limited to, quad serial peripheral interface (QSPI) pins, serial peripheral interface (SPI) pins, controller area network flexible data-rate (CAN-FD) interface pins, universal asynchronous receiver/transmitter (UART) pins, inter-integrated circuit (I2C) interface pins, pulse-width modulation (PWM) pins, joint test action group (JTAG) pins, and general-purpose input/output (GPIO) pins.

Radar processing circuitry 109 is representative of circuitry capable of executing program instructions. For example, radar processing circuitry 109 may execute calibration process 101 or other software for processing radar signals. In an implementation, radar processing circuitry 109 is configured to collect the radar data for executing calibration process 101. For example, during calibration of processing device 103, radar processing circuitry 109 collects multiple radar detection points, herein referred to as point cloud data, associated with a target moving through 3D scene 119. Radar processing circuitry 109 may then utilize the point cloud data to determine the radar-space ROI of the image which depicts 3D scene 119 via calibration process 101.

In an implementation, radar processing circuitry 109 is also configured to determine whether movement was detected in the radar-space ROI. For example, radar processing circuitry 109 may interpret radar signals captured within 3D scene 119 to determine if motion was detected in the radar-space ROI. If motion was detected, radar processing circuitry 109 may cause a camera subsystem (not shown) to begin recording the movement within the image-space for access by an end user. In an implementation, radar processing circuitry 109 is coupled to controller circuitry 111 and is configured to drive controller circuitry 111.

Controller circuitry 111 is representative of circuitry configured to manage the radar signals which are both sent and received by processing device 103. For example, controller circuitry 111 may direct transceiver circuitry 113 to transmit radar signals, and transceiver circuitry 113 may output the results of the transmitted radar signals to controller circuitry 111. Controller circuitry 111 may then output the received results to radar processing circuitry 109 for interpretation.

Transceiver circuitry 113 is representative of circuitry configured to transmit and receive radar signals. For example, transceiver circuitry 113 may transmit radar signal 115, and in response, receive radar signal 117. Transceiver circuitry 113 delivers the data of radar signal 117 to controller circuitry 111. Controller circuitry 111 routes the data to radar processing circuitry 109, and in response radar processing circuitry 109 analyzes the data of radar signal 117. For example, radar processing circuitry may determine if movement was detected in the radar-space ROI based on the data of radar signal 117.

3D scene 119 is representative of an environment in which a user desires surveillance. For example, in the context of video doorbell applications, 3D scene 119 may be representative of a user's front porch. As such, 3D scene 119 typically represents an outdoor environment.

Figure 2A:
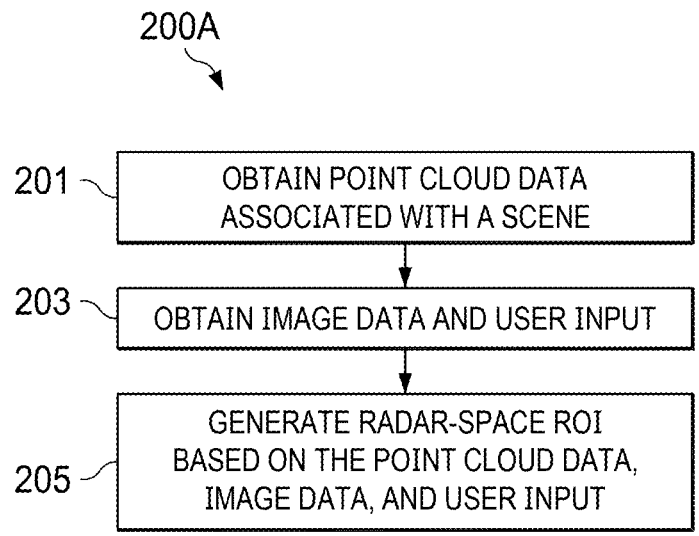
FIG. 2A illustrates a calibration process in an implementation.

FIG. 2A illustrates calibration process 200A in an implementation. Calibration process 200A is representative of a process for calibrating a video surveillance system. For example, calibration process 200A may be representative of calibration process 101 of FIG. 1. Calibration process 200A may be implemented in the context of program instructions that, when executed by a suitable computing system, direct the processing circuitry of the computing system to operate as follows, referring parenthetically to the steps in FIG. 2A. For the purposes of explanation, calibration process 200A will be explained with the elements of FIG. 1. This is not meant to limit the applications of calibration process 200A, but rather to provide an example.

To begin, an executing device initiates calibration process 101. For example, the executing device may be representative of radar processing circuitry 109. Alternatively, the executing device may be representative of processing circuitry configured to calibrate processing device 103. For example, the executing device may be a user device such as a mobile phone, computer, or device of the like.

After initiation of calibration process 101, the executing device obtains point cloud data associated with 3D scene 119 from radar processing circuitry 109 (step 201). Point cloud data is representative of multiple radar detection points associated with a singular moving target. For example, radar processing circuitry 109 may generate point cloud data of a person walking through 3D scene 119 and output the data to the executing device. In an implementation, radar processing circuitry 109 opportunistically generates the point cloud data. For example, radar processing circuitry may gather point cloud data when movement is detected within 3D scene 119. In an implementation, radar processing circuitry 109 gathers at least three separate instances of point cloud data.

Next, the executing device obtains the image data and user input for determining the radar-space ROI (step 203). The image data is representative of the 2D image coordinates which correspond to the target represented by the point cloud data. For example, the image data may represent the 2D image coordinates which correspond to the person walking through 3D scene 119. In an implementation, a camera subsystem collects the 2D image coordinates, and the executing device utilizes the 2D image coordinates of the target to determine the 2D image coordinates which describe the ground plane of 3D scene 119.

Alternatively, the user input is representative of the 2D image coordinates which describe the image-space ROI, such that the image-space ROI is representative of a section within an image in which the user designates surveillance. In an implementation, a camera subsystem displays an image of 3D scene 119 to the user via the executing device, and the user designates where within the image they request surveillance. For example, the user may draw a polygon, line, or other shape on the image to designate where they request surveillance within 3D scene 119. In some implementations the user, in addition to designating the ROI, may also specify a range of heights from the ground plane in which motion is considered to be valid. For example, these height specifications may help filter out movement due to pets (very low height from the ground plane) or due to birds (very high height from the ground plane).

After obtaining the point cloud data, image data, and user input data, the executing device generates a radar-space ROI (step 205). In an implementation, to generate the radar-space ROI, the executing device determines the ground plane equation of an image which depicts 3D scene 119. The ground plane equation is representative of a formula for determining the dimensions of the ground depicted by the image of 3D scene 119. In an implementation, the executing device utilizes the gathered point cloud data and image data to determine the ground plane equation. Once determined, the executing device converts the 2D image coordinates of the image-space ROI into 3D real-world coordinates. As a result of the conversion, the executing device outputs the radar-space ROI.

Figure 2B:
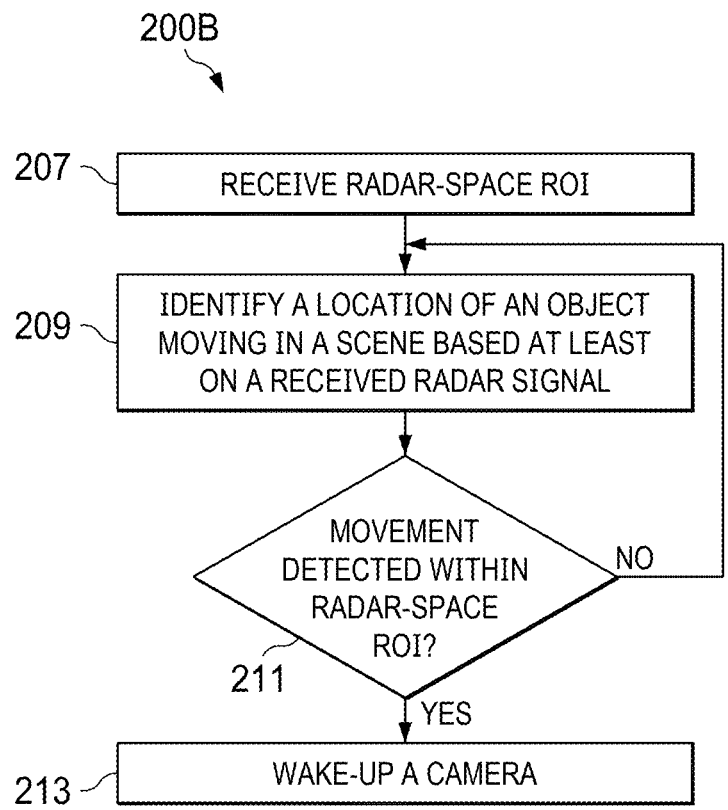
FIG. 2B illustrates a detection process in an implementation.

Now turning to the next figure, FIG. 2B illustrates detection process 200B in an implementation. Detection process 200B is representative of a process for detecting motion in an environment. Detection process 200B may be implemented in the context of program instructions that, when executed by a suitable computing system, direct the processing circuitry of the computing system to operate as follows, referring parenthetically to the steps in FIG. 2B. For the purposes of explanation, detection process 200B will be explained with the elements of FIG. 1. This is not meant to limit the applications of detection process 200B, but rather to provide an example.

To begin, radar processing circuitry 109 receives the radar-space ROI (step 207). Radar processing circuitry 109 analyzes the 3D real-world coordinates of the radar-space ROI to determine where to detect motion within 3D scene 119.

Next, radar processing circuitry 109 identifies a location of an object moving within 3D scene 119 based at least on a radar signal received by transceiver circuitry 113 (step 209). For example, transceiver circuitry 113 may emit radar signal 115 and in response, receive radar signal 117. Transceiver circuitry 113 transmits the data of radar signal 117 to radar processing circuitry 109 and radar processing circuitry 109 analyzes the data of radar signal 117 to determine if movement was detected within the radar-space ROI (step 211). For example, radar processing circuitry 109 may detect whether movement occurred in the radar-space ROI as follows: The 3D coordinates of the point(s) where movement occurred (determined by radar processing circuitry 109) are first projected onto the ground plane. It is then determined if these projections lie within the space (e.g., polygon) defined by the radar-space ROI. Additionally, radar processing circuitry 109 may also determine if the height(s) of the 3D coordinates of the detected point(s) lie within the range of permissible height programmed by the user.

If radar processing circuitry 109 determines that movement was detected within the radar-space ROI, then radar processing circuitry 109 alerts a camera to wake-up and begin recording the detected movement (step 213). Alternatively, if radar processing circuitry 109 determines that movement was not detected within the radar-space ROI, then radar processing circuitry 109 returns to monitoring 3D scene 119. It should be noted, that if no movement was detected within the radar-space ROI, then the camera remains in an off-state. In an implementation, the off-state of the camera describes a state where the camera is not recording 3D scene 119.

Figure 3:
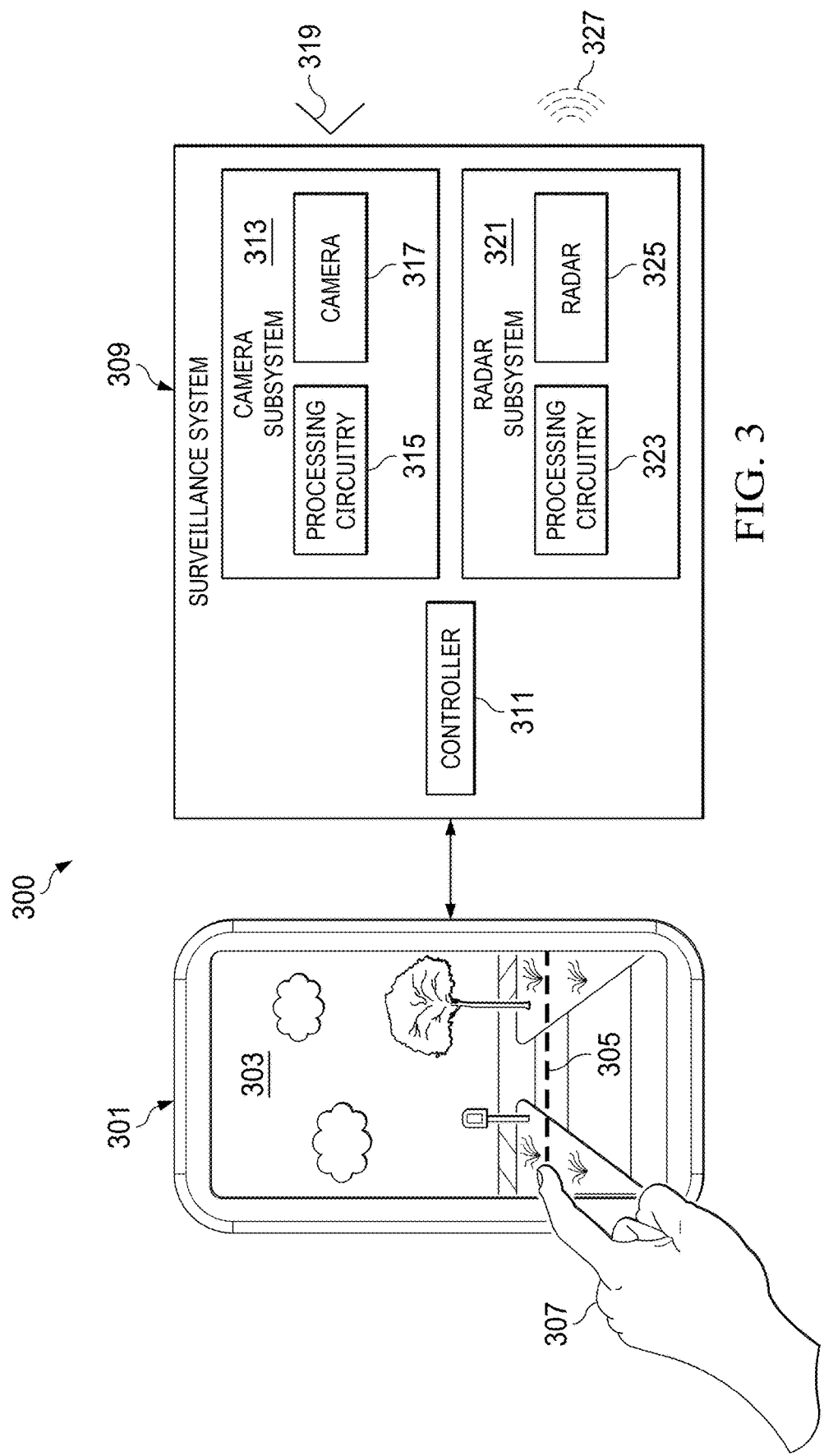
FIG. 3 illustrates a system in an implementation.

FIG. 3 illustrates system 300 in an implementation. System 300 is representative of a video surveillance system configured to detect movement within an environment. System 300 includes mobile device 301 and surveillance system 309.

Mobile device 301 is representative of a device in which a user may interact with. For example, user 307 may communicate with surveillance system 309 via mobile device 301. It should be noted that mobile device 301 is representative of an exemplary user device. As such, mobile device 301 may be representative of a mobile phone, laptop, or user device of the like. Mobile device 301 includes but is not limited to, user interface 303.

User interface 303 is representative of an interface in which user 307 may use to interact with mobile device 301. In an implementation, user 307 utilizes user interface 303 to provide an image-space ROI to surveillance system 309. The image-space ROI is representative of a section within an environment in which user 307 designates surveillance. In an implementation, camera subsystem 313 provides an image of an environment to user 307 via user interface 303. For example, in the context of video doorbell applications, camera subsystem 313 may provide an image of user's 307 driveway to mobile device 301. Mobile device 301 displays the image to user 307 via user interface 303 and user 307 may designate where within the image they request surveillance. For example, user 307 may draw line 305 to designate the image-space ROI. To be actionable to radar subsystem 321, the 2D image coordinates of the image-space ROI are converted to 3D real-world coordinates via a calibration process, later discussed with reference to FIG. 4A.

Surveillance system 309 is representative of one or more circuits configured to execute program code. For example, surveillance system 309 may be representative of a video doorbell system configured to determine when to wake-up a camera based on movement detected within a designated ROI. Surveillance system 309 includes, but is not limited to, controller 311, camera subsystem 313, and radar subsystem 321.

Controller 311 is representative of one or more circuits configured to execute program code. For example, controller 311 may be representative of a microcontroller unit (MCU), a central processing unit (CPU), an application-specific integrated circuit (ASIC), or other processing device of the like. In an implementation, controller 311 is configured to provide access to a computer network. For example, surveillance system 309 may communicate to mobile device 301 by way of controller 311. Further, controller 311 is also configured to manage the communication between the components of surveillance system 309. For example, controller 311 may alert camera subsystem 313 to begin recording when directed by radar subsystem 321.

Camera subsystem 313 is representative of one or more circuits configured to provide image or video data of an environment. For example, camera subsystem 313 may provide image or video data to mobile device 301 via controller 311. Camera subsystem 313 includes, but is not limited to, processing circuitry 315 and camera 317.

Processing circuitry 315 is representative of one or more circuits configured to execute program code. For example, processing circuitry 315 may execute software for interpreting image data. Processing circuitry 315 may be representative of an MCU, a CPU, an ASIC, a graphics processing unit (GPU), a digital signal processor (DSP), or another processing device of the like. In an implementation, processing circuitry 315 is configured to calibrate surveillance system 309. For example, processing circuitry 315 may execute a calibration process, such as calibration process 101 of FIG. 1. In an implementation, the calibration process, when executed, causes processing circuitry 315 to determine the ground plane equation of a respective environment, later discussed with reference to FIG. 4A.

Camera 317 is representative of a device configured to collect image or video data of a respective environment. For example, camera 317 may transmit signal 319 to capture an image of, or a recording of, the respective environment. Camera 317 sends the image or video data to controller 311, and controller 311 transmits the respective data to mobile device 301. In an implementation, camera subsystem 313 remains in an off-state until camera 317 is alerted by controller 311 to begin recording. The off-state of camera subsystem 313 describes a low-power state which reserves battery life of surveillance system 309. For example, the off-state may describe a state where camera 317 is not collecting image or video data.

Radar subsystem 321 is representative of one or more circuits configured to detect movement via radar. For example, radar subsystem 321 may be representative of processing device 103 of FIG. 1. Radar subsystem 321 includes, but is not limited to, processing circuitry 323 and radar 325.

Processing circuitry 323 (e.g., radar processing circuitry 109) is representative of one or more circuits configured to execute program code. For example, processing circuitry 323 may execute software for interpreting radar data. Processing circuitry 323 may be representative of an MCU, a CPU, an ASIC, a GPU, a DSP, or another processing device of the like. In an implementation, processing circuitry 323 is configured to calibrate surveillance system 309. For example, processing circuitry 323 may execute a calibration process, such as calibration process 101 of FIG. 1. In an implementation, the calibration process, when executed, causes processing circuitry 323 to determine the ground plane equation of a respective environment.

Radar 325 is representative of a device configured to collect radar data related to a respective environment. For example, radar 325 may be representative of transceiver circuitry 113 of FIG. 1. During calibration, radar 325 may transmit signal 327 to gather point cloud data of an object moving through an environment. Alternatively, during operation, radar 325 may transmit signal 327 to detect movement within the radar-space ROI.

Figure 4A:
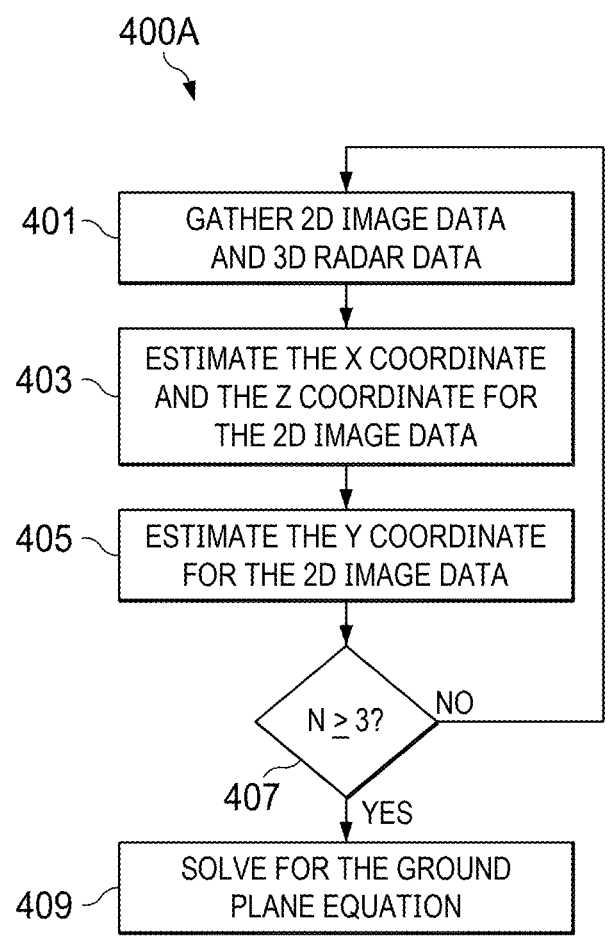
FIG. 4A illustrates another calibration process in an implementation.

FIG. 4A illustrates calibration process 400A in an implementation. Calibration process 400A is representative of software for determining the ground plane equation associated with an image. For example, calibration process 400A may be representative of calibration process 101 of FIG. 1 or calibration process 200A of FIG. 2A. Calibration process 400A may be implemented in the context of program instructions that, when executed by a suitable computing system, direct the processing circuitry of the computing system to operate as follows, referring parenthetically to the steps in FIG. 4A. For the purposes of explanation, calibration process 400A will be explained with respect to the elements of FIG. 3. This is not meant to limit the applications of calibration process 400A, but rather to provide an example.

To begin, an executing device (e.g. mobile device 301, controller 311, processing circuitry 315, or processing circuitry 323), directs radar subsystem 321 to gather 3D radar data and camera subsystem 313 to gather 2D image data associated with an object moving through a scene (step 401). The scene in which the object moves through is representative of the environment which is being monitored by radar subsystem 321 and camera subsystem 313. For example, in the context of video doorbell applications, the scene may be representative of an image which depicts a user's front lawn. In an implementation, radar subsystem 321 and camera subsystem 313 opportunistically gather the respective data. For example, radar subsystem 321 and camera subsystem 313 may collect the respective data whenever an object, such as a person, happens to move through the scene.

The 2D image data gathered by camera subsystem 313 is representative of coordinates for a bounding box which encompasses the object moving through the scene. The coordinates of the bounding box are representative of 2D image coordinates which may be determined through various image processing algorithms. For example, processing circuitry 315 may utilize an image processing algorithm that detects humans in an image and draws a bounding box around them. It should be noted that the data collected by camera subsystem 313 is collected within the image-space, as such, the coordinates of the bounding box may be determined based on the coordinates of the corresponding pixels in the image-space. In an implementation, the output of camera subsystem 313 is representative of the 2D image coordinates which correspond to the center of the bottom of the bounding box, herein referred to as (u, v).

The 3D radar data gathered by radar subsystem 321, herein referred to as point cloud data, is representative of a set of coordinates which correspond to the radar reflections that were detected within the bounding box. In some implementations radar subsystem 321 runs a tracking algorithm that tracks a moving target (such as a person) and outputs a set of coordinates (i.e., point cloud data) which correspond to the detected points associated with the moving target. The set of coordinates which are outputted by radar subsystem 321 are representative of 3D real-world coordinates (e.g., (X, Y, Z)). To determine the ground plane equation of the scene, radar subsystem 321 determines the 3D real-world coordinates which correspond to the output of camera subsystem 313 (i.e., (u, v)).

After gathering the 2D image data and 3D radar data, the executing device estimates the X coordinate and the Z coordinate which corresponds to the output of camera subsystem 313 (step 403). In an implementation, to estimate the X and Z coordinates, the executing device takes an average of the X and Z coordinates represented by the point cloud data. For example, if the point cloud data includes three radar detection points, then the executing device will take an average of the three X coordinates and an average of the three Z coordinates to determine the X and Z coordinates which correspond to (u, v).

Next, the executing device estimates the Y coordinate which corresponds to the output of camera subsystem 313 (step 405). It should be noted that, it is not possible to reliably determine the Y coordinate which corresponds to the output of camera subsystem 313 (center of the bottom of the bounding box) merely by averaging the Y coordinates of the radar detection points, due to the specular nature of radar reflections, and the fact that radar subsystem 321 may have a narrow elevation Field of View. In an implementation, the executing device estimates the Y coordinate through camera projection theory. Camera projection theory describes a method for mapping 3D real-world coordinates to 2D image coordinates based on known constants of camera 317. For example, camera projection theory may be demonstrated with the following equations:

$$u = \frac{f_u X}{Z} + c_u \qquad (1)$$

$$v = \frac{f_v Y}{Z} + c_v \qquad (2)$$

Such that in equation (1): u represents the 2D image coordinate in the x dimension, $f_u$ represents the focal length of camera 317 in the x dimension, X and Z represent known 3D real-world coordinates, $c_u$ represents the transitional offset between the 2D image coordinate system and the 3D real-world coordinate system in the x dimension, and such that in equation (2): v represents the 2D image coordinate in the y dimension, $f_v$ represents the focal length of camera 317 in the y dimension, Y and Z represent known 3D real-world coordinates, and $c_v$ represents the transitional offset between the 2D image coordinate system and the 3D real-world coordinate system in the y dimension.

In an implementation, the executing device utilizes equation (2) of camera projection theory to estimate the Y coordinate which corresponds to the output of camera subsystem 313. Such that in equation (2): v represents the output of camera subsystem 313 in the y dimension, $f_v$ represents the focal length of camera 317 in the y dimension, Z represents the estimated Z coordinate (found in step 403), and $c_v$ is a known value which represents the transitional offset between the 2D image coordinate system and the 3D real-world coordinate system.

After estimating the X, Y, and Z coordinates which correspond to the output of camera subsystem 313, (u, v), the executing device determines whether enough data has been collected to solve for the ground plane equation (step 407). In an implementation, to properly calibrate surveillance system 309, radar subsystem 321 and camera subsystem 313 collects at least three separate instances of data. For example, a first instance may include a person walking through the scene, a second instance may include a car driving through the scene, and a third instance may be a secondary person walking through the scene. It should be noted that, more than three instances of data may be collected to improve the accuracy of the determined ground plane equation. For example, hundreds of instances of data may be collected, and the executing device may utilize a method of least squares to determine the ground plane equation.

After radar subsystem 321 and camera subsystem 313 collect data of at least three instances, the executing device may solve for the ground plane equation (step 409). For example, the equation of the ground plane may be represented with the following formula:

$$aX + bY + cZ = 1 \quad (3)$$

Such that in equation (3): a, b, and c represent unknown values, and X, Y, and Z represent the estimated coordinates. In an implementation, to solve for a, b, and c, the executing device uses the following equations:

$$aX_1 + bY_1 + cZ_1 = 1 \quad (4)$$

$$aX_2 + bY_2 + cZ_2 = 1 \quad (5)$$

$$aX_3 + bY_3 + cZ_3 = 1 \quad (6)$$

Such that in equation (4): $(X_1, Y_1, Z_1)$ represent the first set of estimated coordinates, such that in equation (5): $(X_2, Y_2, Z_2)$ represent the second set of estimated coordinates, and such that in equation (6): $(X_3, Y_3, Z_3)$ represent the third set of estimated coordinates.

After solving for a, b, and c, the executing device outputs the ground plane equation for the scene. For example, the executing device may output the following equation:

$$aX + bY + cZ = 1 \quad (7)$$

Such that in equation (7): a, b, and c represent known values, and X, Y, and Z represent unknown 3D real-world coordinates.

Figure 4B:
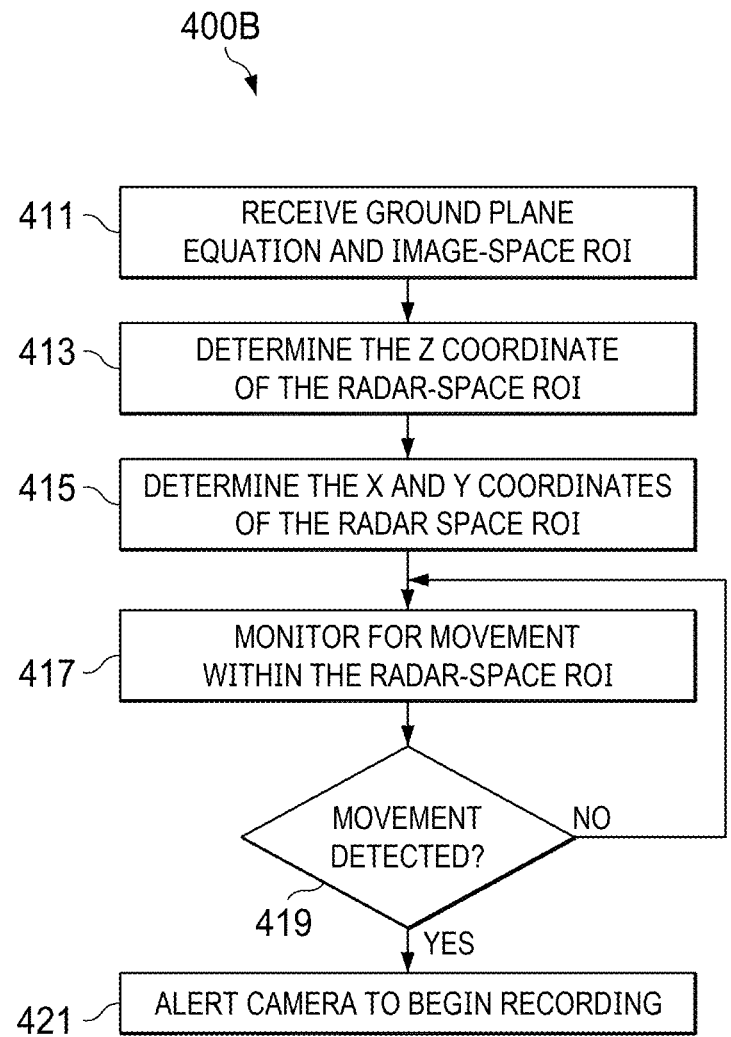
FIG. 4B illustrates another detection process in an implementation.

FIG. 4B illustrates detection process 400B in an implementation. Detection process 400B is representative of a process for detecting motion in an environment. For example, detection process 400b may be representative of detection process 200B of FIG. 2B. Detection process 400B may be implemented in the context of program instructions that, when executed by a suitable computing system, direct the processing circuitry of the computing system to operate as follows, referring parenthetically to the steps in FIG. 4B. For the purposes of explanation, detection process 400B will be explained with the elements of FIG. 3. This is not meant to limit the applications of detection process 200B, but rather to provide an example.

To begin, the executing device (e.g. mobile device 301, controller 311, processing circuitry 315, or processing circuitry 323) receives the ground plane equation produced by calibration process 400A, and the image-space ROI (step 411). The image-space ROI is representative of 2D image coordinates which correspond to a section of an environment in which the user requests surveillance. For example, user 307 may designate line 305 as the image-space ROI in which they request surveillance.

After receiving the ground plane equation and the image-space ROI, the executing device may utilize the determined ground plane equation (i.e., equation (7)) to convert the 2D image coordinates of the image-space ROI into 3D real-world coordinates. Meaning, the executing device may utilize the ground plane equation to convert the image-space ROI into a radar-space ROI.

To determine the radar-space ROI, the executing device first determines the Z coordinate which corresponds to the image-space ROI (step 413). For example, the executing device may employ equations (1), (2), and (7) to determine the Z coordinate of the radar-space ROI such that:

$$a\left(\frac{(u-c_u)Z}{f_u}\right) + b\left(\frac{(v-c_v)Z}{f_v}\right) + cZ = \quad (8)$$

$$1 \rightarrow Z = \frac{1}{a\left(\frac{(u-c_u)}{f_u}\right) + b\left(\frac{(v-c_v)}{f_v}\right) + c}$$

After determining the Z coordinate which corresponds to the image-space ROI, the executing device determines the X and Y coordinates which correspond to the image-space ROI (step 415). For example, the executing device may employ equations (1), and (2), to determine the X and Y coordinates of the user designated ROI such that:

$$X = \frac{(u-c_u)Z}{f_u} \quad (9)$$

-continued $$Y = \frac{(v - c_v)Z}{f_Y} \quad (10)$$

Such that in equations (9) and (10): Z represents the Z coordinate found via equation (8). As a result, the executing device outputs the radar-space ROI to processing circuitry 323.

After receiving the radar-space ROI, radar subsystem 321 monitors for movement within the environment (step 417). For example, radar 325 may transmit radar signal 327 and processing circuitry 323 may analyze the data collected from radar signal 327 to determine if any movement was detected within the radar-space ROI (step 419). If no movement was detected, then radar subsystem 321 returns to monitoring for movement (step 417). Alternatively, if movement was detected, then processing circuitry 323 directs controller 311 to alert camera 317 to begin recording (step 421). Camera subsystem 313 may transmit the collected video data to controller 311, and controller 311 may stream the video data to mobile device 301 for access by user 307.

Now turning to the next figures, FIG. 5A-5D illustrate example sequences for executing calibration process 400A and detection process 400B with respect to the elements of FIG. 3. As such, operational sequences 500A, 500B, 500C, and 500D include mobile device 301, controller 311, camera subsystem 313, and radar subsystem 321.

To begin operational sequence 500A, processing circuitry 315 of camera subsystem 313 initiates calibration process 400A and directs camera subsystem 313 and radar subsystem 321 to begin collecting the relevant data for computing the ground plane equation. In an implementation, camera subsystem 313 and radar subsystem 321 opportunistically collect the relevant data for determining the ground plane equation. For example, camera subsystem 313 and radar subsystem 321 may collect data when an object, such as a person, happens to move through the depicted environment.

Data collected by radar subsystem 321 is representative of 3D real-world coordinates which correspond to an array of radar detection points associated with the moving object. In an implementation, radar subsystem 321 identifies multiple radar detection points associated with a moving target in the form of a point cloud, and outputs the point cloud data to processing circuitry 315.

Data collected by camera subsystem 313 is representative of 2D image coordinates which correspond to a bounding box that encompasses the moving object. In an implementation, radar subsystem 321 and camera subsystem 313 collect at least three instances of point cloud data and corresponding image data respectively and output the collected data to processing circuitry 315.

In response to receiving the multiple instances of both point cloud data and image data, processing circuitry 315 calculates the ground plane equation for the image. In other words, processing circuitry 315 determines a 2D to 3D coordinate map.

After calibration of surveillance system 309, processing circuitry 315 executes detection process 400B. To begin, user 307 utilizes user interface 303 to designate a region of interest in the 2D image-space. For example, camera subsystem 313 may present an image of the environment to user 307, and user 307 may designate where in the image they request protection. Once designated, processing circuitry 315 utilizes the ground plane equation to map the 2D image coordinates of the image-space ROI to 3D real-world coordinates. As a result, processing circuitry 315 outputs the radar-space ROI to radar subsystem 321.

After receiving the radar-space ROI, radar subsystem 321 begins transmitting radar signals across the environment to determine if movement was detected within the radar-space ROI. When motion is detected within the radar-space ROI, processing circuitry 323 alerts controller 311 to wake-up camera subsystem 313. When awoken, processing circuitry 315 begins transmitting image data collected by camera 317 to controller 311, and controller 311 proceeds to alert user 307 via user interface 303 that motion was detected within the user designated ROI. In an implementation, when motion is detected within the radar-space ROI, controller 311 streams the video data of camera 317 to mobile device 301 for access by user 307.

Figure 5A:
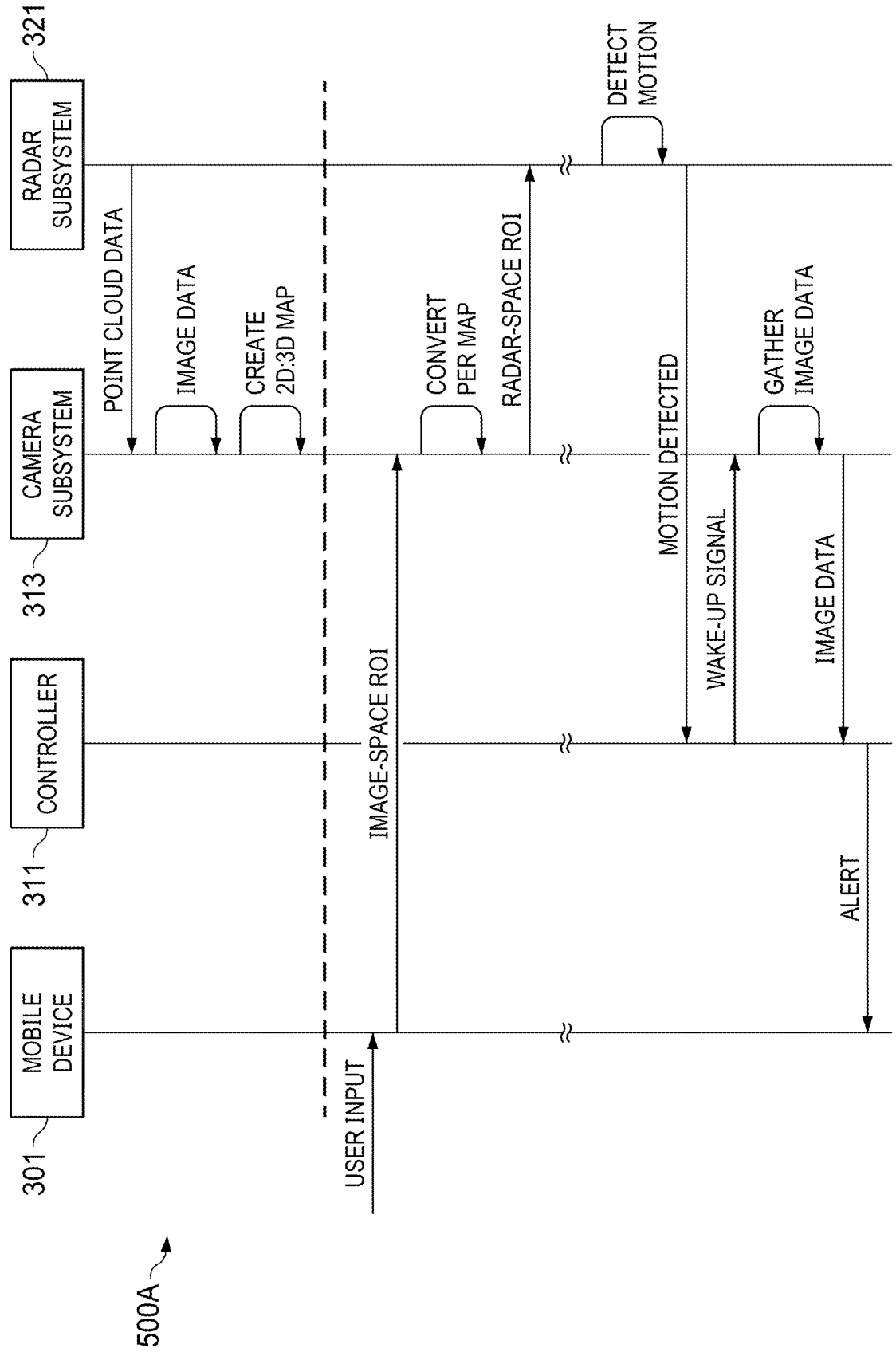
FIGS. 5A-5D illustrate an operational sequence in an implementation.
Figure 5B:
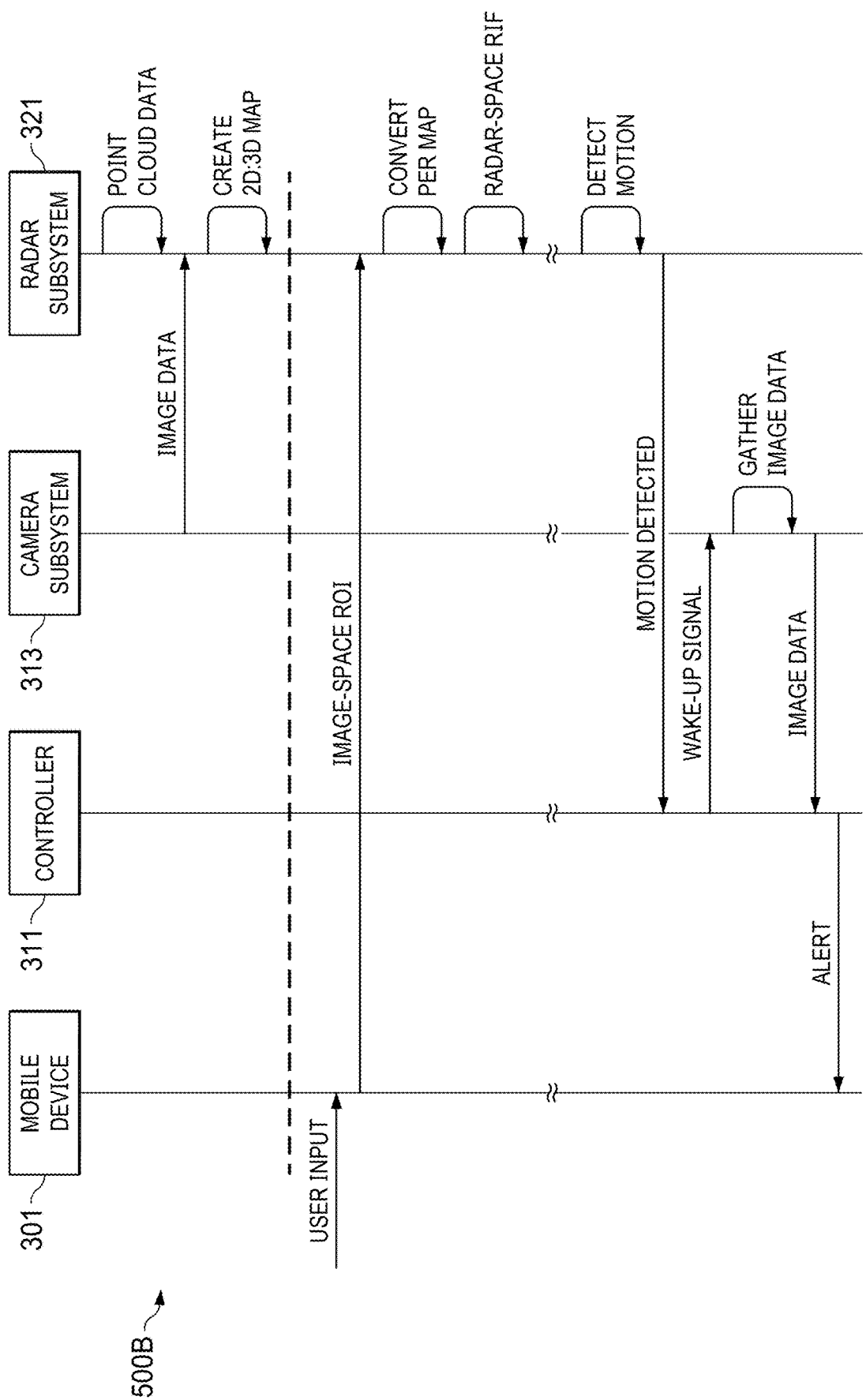
Figure 5C:
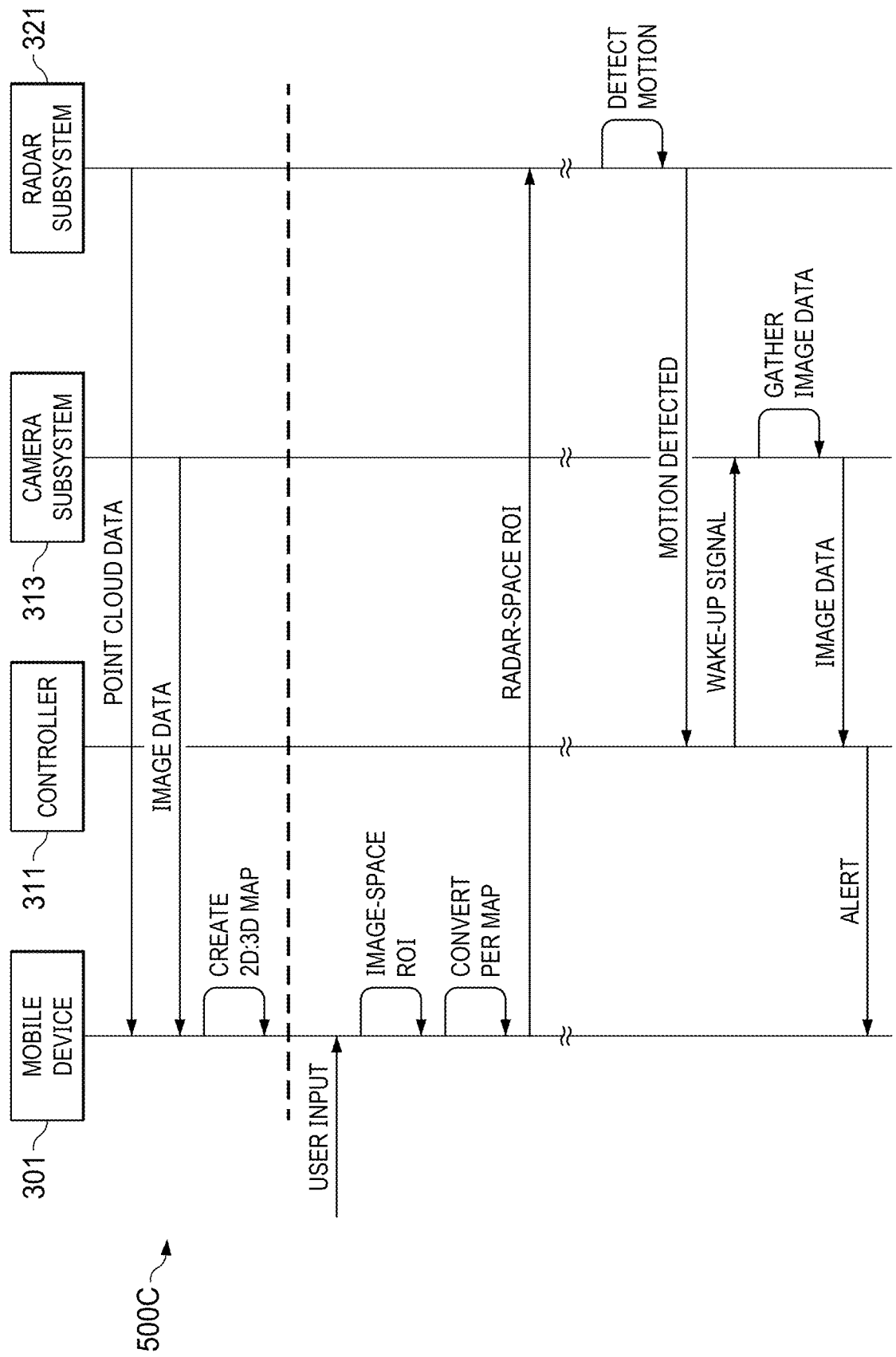

Now turning to FIG. 5B, operational sequence 500B illustrates a variation of operational sequence 500A. To begin, processing circuitry 323 of radar subsystem 321 initiates calibration process 400A and directs camera subsystem 313 to collect the relevant image data and radar subsystem 321 collect the relevant point cloud data for computing the ground plane equation. After receiving multiple instances of both point cloud data and image data, processing circuitry 323 calculates the ground plane equation for the image to determine a 2D to 3D coordinate map.

Once surveillance system 309 is calibrated, processing circuitry 323 executes detection process 400B. To begin, user 307 designates an image-space ROI via user interface 303. Once designated, processing circuitry 323 utilizes the ground plane equation to map the 2D image coordinates of the image-space ROI to 3D real-world coordinates. As a result, processing circuitry 323 generates the radar-space ROI.

After determining the radar-space ROI, radar subsystem 321 begins transmitting radar signals across the environment to determine if movement was detected within the radar-space ROI. When movement is detected within the radar-space ROI, processing circuitry 323 alerts controller 311 to wake-up camera subsystem 313. When awoken, processing circuitry 315 begins transmitting image data collected by camera 317 to controller 311, and controller 311 proceeds to alert user 307 via user interface 303 that motion was detected within the user designated ROI. In addition to alerting user 307, controller 311 also streams the video data of camera 317 to mobile device 301 for access by user 307.

Turning now to the next Figure, operational sequence 500C illustrates a variation of operational sequences 500A and 500B. To begin operational sequence 500C, mobile device 301 initiates calibration process 400A and directs camera subsystem 313 to collect the relevant image data and radar subsystem 321 collect the relevant point cloud data for computing the ground plane equation. After receiving multiple instances of both point cloud data and image data, mobile device 301 calculates the ground plane equation for the image to determine the 2D to 3D coordinate map.

Once surveillance system 309 is calibrated, mobile device 301 executes detection process 400B. To begin, user 307 designates an image-space ROI via user interface 303, and in response mobile device 301 utilizes the ground plane equation to map the 2D image coordinates of the image-space ROI to 3D real-world coordinates. As a result, mobile device 301 outputs the radar-space ROI to radar subsystem 321.

Radar subsystem 321 receives the radar-space ROI, and in response, begins transmitting radar signals across the environment to determine if movement was detected within the radar-space ROI. When movement is detected within the radar-space ROI, processing circuitry 323 alerts controller 311 to wake-up camera subsystem 313. When awoken, processing circuitry 315 begins transmitting image data collected by camera 317 to controller 311, and controller 311 proceeds to alert user 307 via user interface 303 that motion was detected within the user designated ROI. In addition to altering user 307, controller 311 also streams the video data of camera 317 to mobile device 301 for access by user 307.

Figure 5D:
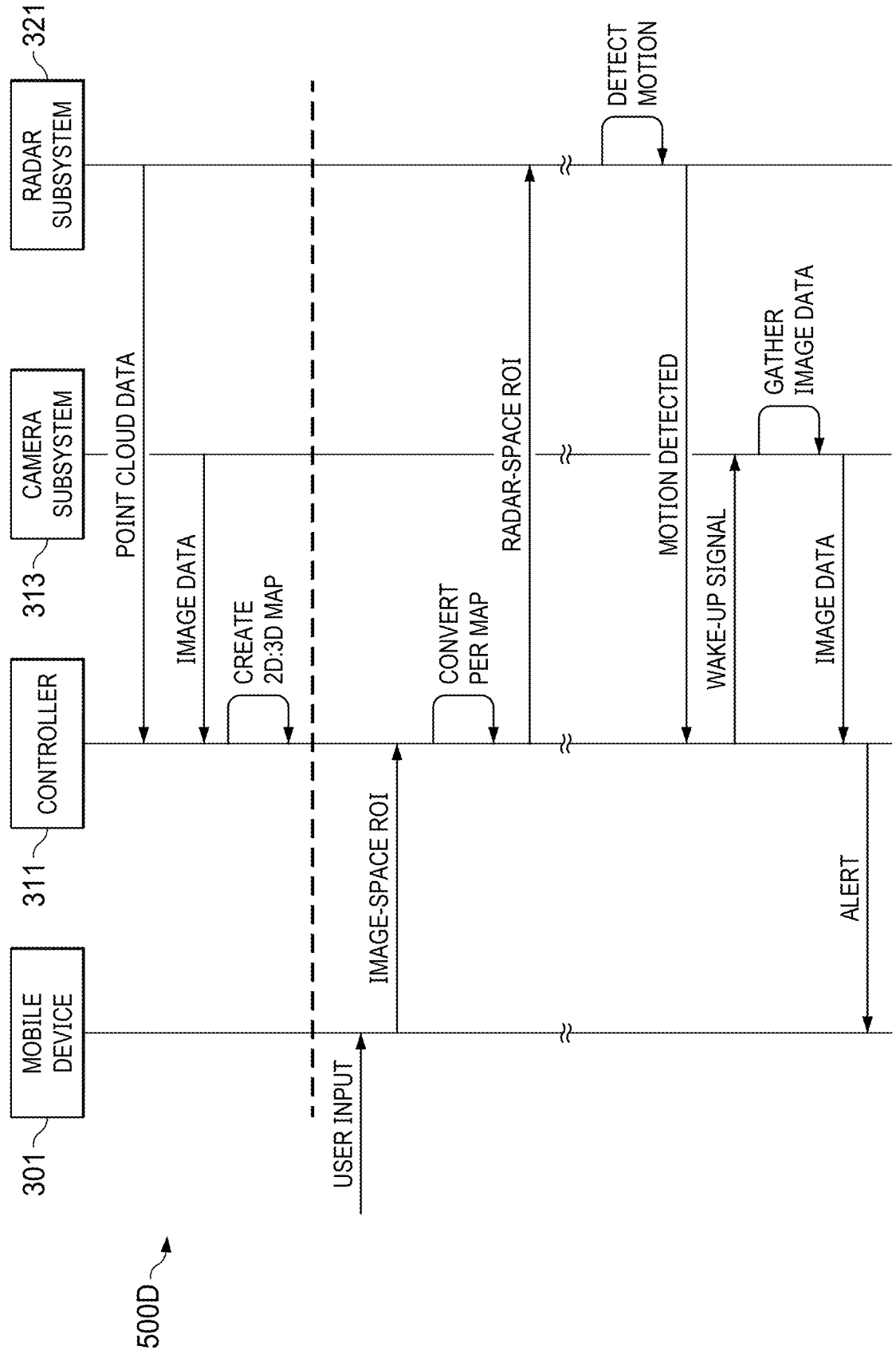

Now turning to FIG. 5D, operational sequence 500D illustrates a variation of operational sequences 500A, 500B, and 500C. To begin, controller 311 initiates calibration process 400A and directs camera subsystem 313 to collect the relevant image data and radar subsystem 321 collect the relevant point cloud data for computing the ground plane equation. After receiving multiple instances of both point cloud data and image data, controller 311 calculates the ground plane equation for the image to determine the 2D to 3D coordinate map.

Once surveillance system 309 is calibrated, controller 311 executes detection process 400B. To begin, user 307 designates an image-space ROI via user interface 303, and mobile device 301 transmits the image-space ROI to controller 311. Controller 311 receives the image-space ROI, and in response, utilizes the ground plane equation to map the 2D image coordinates of the image-space ROI to 3D real-world coordinates. As a result, controller 311 outputs the radar-space ROI to radar subsystem 321.

Radar subsystem 321 receives the radar-space ROI, and in response, begins transmitting radar signals across the environment to determine if movement was detected within the radar-space ROI. When movement is detected within the radar-space ROI, processing circuitry 323 alerts controller 311 to wake-up camera subsystem 313. When awoken, processing circuitry 315 begins transmitting image data collected by camera 317 to controller 311, and controller 311 proceeds to alert user 307 via user interface 303 that motion was detected within the user designated ROI. In addition to altering user 307, controller 311 also streams the video data of camera 317 to mobile device 301 for access by user 307.

Figure 6:
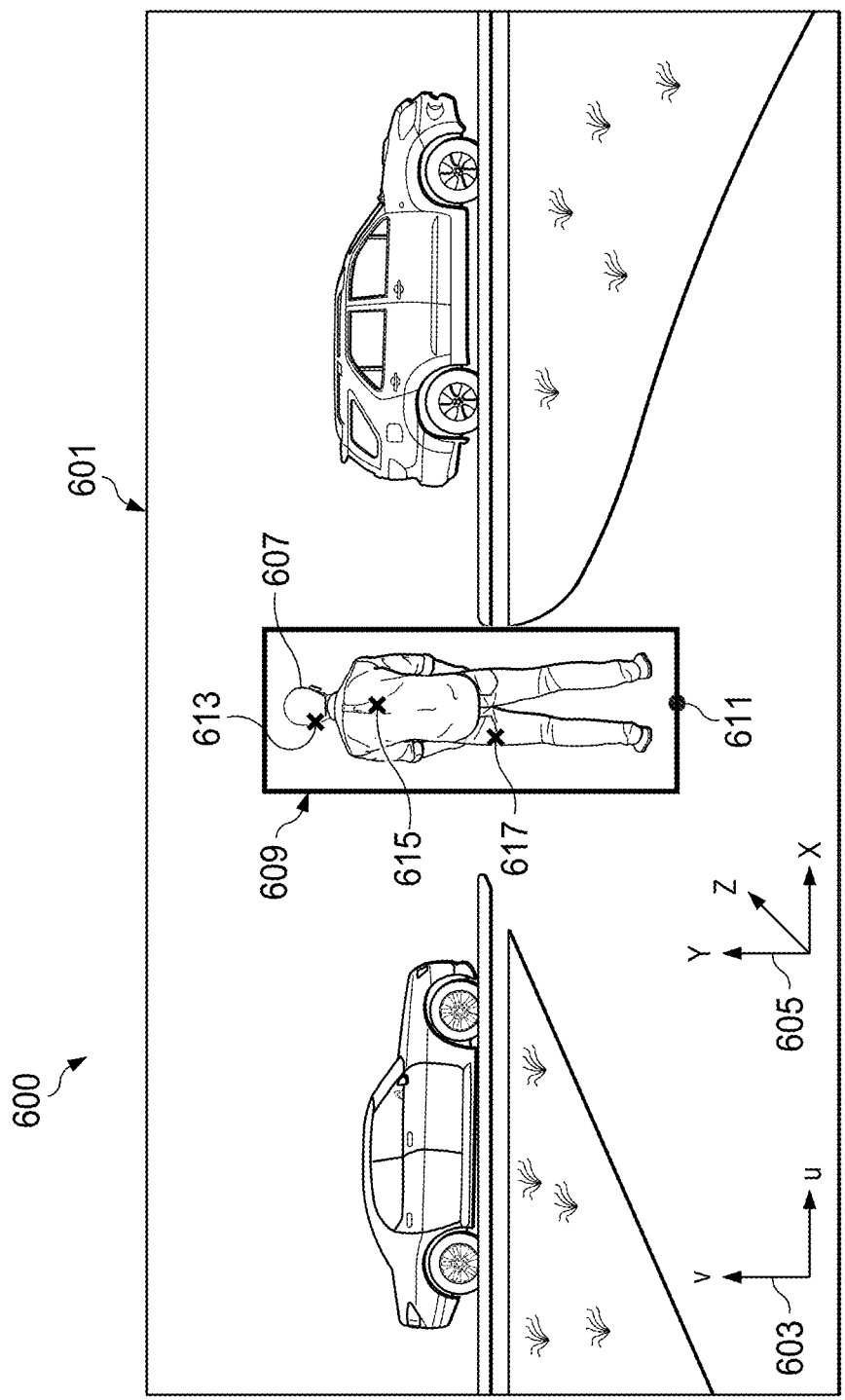
FIG. 6 illustrates a calibration scenario in an implementation.

FIG. 6 illustrates calibration scenario 600 in an implementation. Calibration scenario 600 is representative of scenario for determining the ground plane equation of a respective scene. For example, calibration scenario 600 may demonstrate a scenario for performing calibration process 101, 200A, or 400A. Calibration scenario 600 includes scene 601, 2D coordinate axis 603, 3D coordinate axis 605, person 607, bounding box 609, 2D image coordinate 611, and radar reflections 613, 615, and 617.

Scene 601 is representative of an image of an environment in which a user desires surveillance. For example, scene 601 may depict a user's front lawn or front porch. In an implementation, scene 601 is further representative of the image which is displayed to the user. For example, in the context of video surveillance applications, scene 601 may be streamed to a user's device, by way of a host device (e.g., controller 311), later discussed with reference to FIG. 7.

2D coordinate axis 603 is representative of an axis for describing the 2D image coordinates depicted in scene 601 (i.e., (u, v)). For example, 2D coordinate axis 603 may be utilized to determine the 2D image coordinates (i.e., 2D image coordinate 611) of bounding box 609. 3D coordinate axis 605 is representative of an axis for describing the 3D real-world coordinates depicted in scene 601 (i.e., (X, Y, Z)). For example, 3D coordinate axis 605 may be utilized to determine the 3D real-world coordinates of radar reflections 613, 615, and 617.

Person 607 is representative of an object which moves through scene 601. In an implementation, person 607 is further representative of an object for calibrating a video surveillance system (e.g., surveillance system 309). For example, person 607 may move through scene 601, and the video surveillance system may gather 2D image data and 3D radar data corresponding to person 607. In an implementation, the video surveillance system gathers 2D image data and 3D radar data of person 607 to determine the ground plane equation represented by scene 601. The ground plane equation is a formula for determining the dimensions of the ground on which person 607 walks across.

Bounding box 609 is representative of the 2D image data gathered by the video surveillance system. For example, a camera subsystem (e.g., camera subsystem 313) of a video surveillance system may determine the 2D image coordinates which correspond to bounding box 609. In an implementation, the camera subsystem uses various image processing algorithms to determine 2D image coordinate 611 of bounding box 609. 2D image coordinate 611 is representative of a coordinate which corresponds to the center of the bottom of bounding box 609. In other words, 2D image coordinate 611 is representative of the coordinate which describes the location of the ground within scene 601.

Radar reflections 613, 615, and 617 represent the 3D radar data, herein referred to as point cloud data, gathered by the video surveillance system. For example, a radar subsystem (e.g., radar subsystem 321) of a video surveillance system may determine the 3D real-world coordinates which correspond to each radar reflection of the point cloud data. In an implementation, the video surveillance system utilizes the 3D real-world coordinates of radar reflections 613, 615, and 617 to determine the 3D real-world coordinate which corresponds to 2D image coordinate 611. The video surveillance system may utilize the 3D real-world representation of 2D image coordinate 611 to determine the ground plane equation of scene 601.

Figure 7:
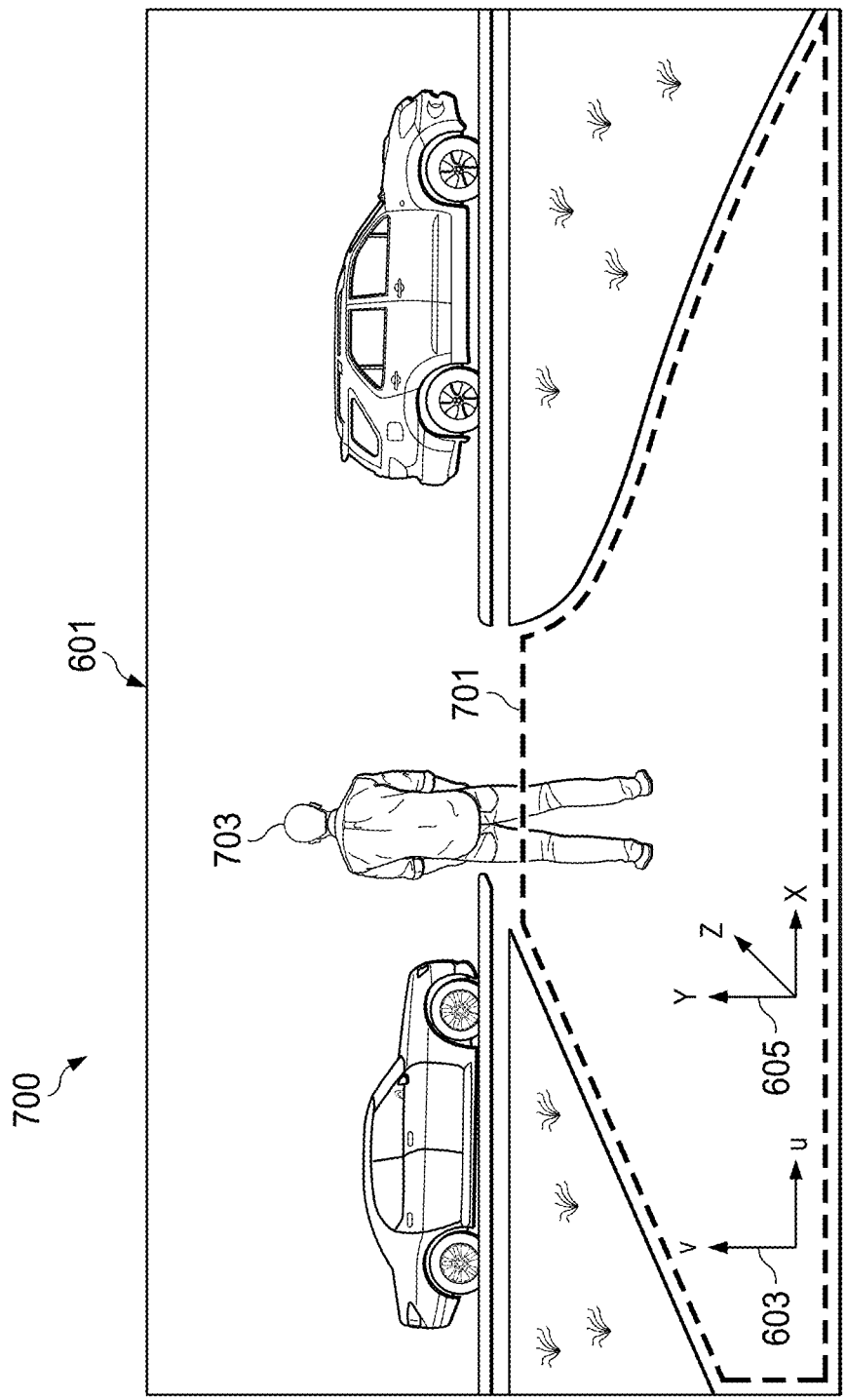
FIG. 7 illustrates a detection scenario in an implementation.

FIG. 7 illustrates detection scenario 700 in an implementation. Detection scenario 700 is representative of a scenario for detecting movement within a radar-space ROI. For example, detection scenario 700 may demonstrate a scenario for performing detection process 200B of FIG. 2B or detection process 400B of FIG. 4B. Detection scenario 700 includes scene 601, 2D coordinate axis 603, 3D coordinate axis 605, radar-space ROI 701, and person 703.

Scene 601 is representative of the environment depicted in FIG. 6. In an implementation, scene 601 is further representative of the image which is presented to the user when movement is detected within the radar-space ROI. For example, in the context of video surveillance applications, scene 601 may be streamed to a user's device, by way of a host device (e.g., controller 311), when motion is detected within radar-space ROI 701.

2D coordinate axis 603 is representative of an axis for describing the 2D image coordinates depicted in scene 601 (i.e., (u, v)), while 3D coordinate axis 605 is representative of an axis for describing the 3D real-world coordinates depicted in scene 601 (i.e., (X, Y, Z)). For example, 2D coordinate axis 603 and 3D coordinate axis 605 may be utilized to determine the 2D image coordinates and 3D real-world coordinates of person 703.

Radar-space ROI 701 is representative of a section within scene 301 in which the user requests surveillance. Radar-space ROI 701 is represented with 3D real-world coordinates and may be any type of shape or line. In an implementation, a user is presented with scene 601 and in response, designates an ROI in the 2D image-space. To be actionable to a radar, the 2D image coordinates of the image-space ROI are converted to 3D real-world coordinates.

Person 703 is representative of an object which enters radar-space ROI 701. During operation, a radar monitors for movement within radar-space ROI 701. If movement is detected, such as person 703, the radar alerts a camera subsystem to begin streaming scene 601 to a user's device.

Figure 8:
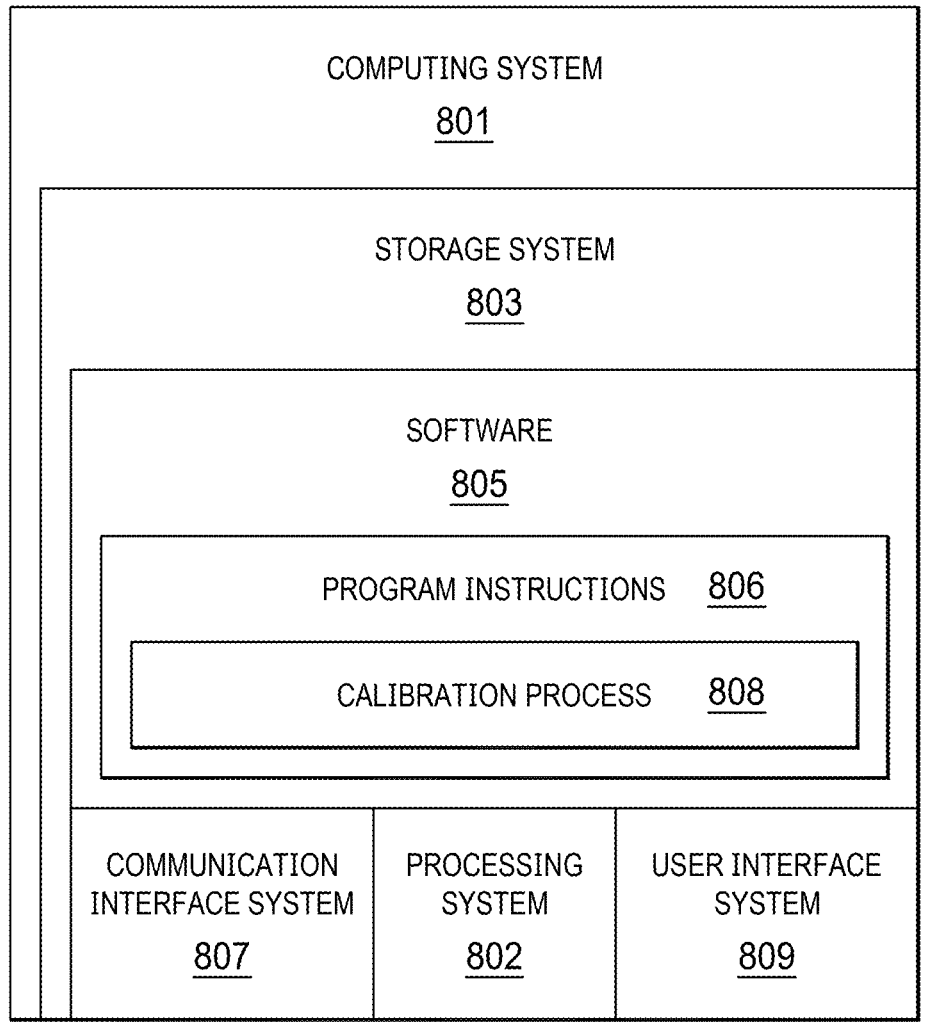
FIG. 8 illustrates a computing system suitable for implementing the various operational environments, architectures, processes, scenarios, and sequences discussed below with respect to the other Figures.

FIG. 8 illustrates an example computer system that may be used in various implementations. For example, computing system 801 is representative of a computing device capable of executing software for calibrating video surveillance systems as described herein. Computing system 801 is representative of any system or collection of systems with which the various operational architectures, processes, scenarios, and sequences disclosed herein for calibrating video surveillance systems may be employed. Examples of computing system 801 include—but are not limited to—micro controller units (MCUs), embedded computing devices, server computers, cloud computers, personal computers, mobile phones, and the like.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809 (optional). Processing system 802 is operatively coupled with storage system 803, communication interface system 807, and user interface system 809. Computing system 801 may be representative of a cloud computing device, distributed computing device, or the like.

Processing system 802 loads and executes software 805 from storage system 803, or alternatively, runs software 805 directly from storage system 803. Software 805 includes program instructions 806, which includes calibration process 808 (e.g., calibration process 101, calibration process 200A, or calibration process 400A). When executed by processing system 802, software 805 directs processing system 802 to operate as described herein for at least the various processes, operational scenarios, and sequences discussed in the foregoing implementations. Computing device 801 may optionally include additional devices, features, or functions not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, digital signal processing units, data processing units, application specific processors, and logic devices, as well as any other type of processing device, combinations, or variations thereof.

Storage system 803 may comprise any computer readable storage media readable and writeable by processing system 802 and capable of storing software 805. Storage system 803 may include volatile and nonvolatile, removable and non-removable, mutable and non-mutable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions 806 and among other functions may, when executed by processing system 802, direct processing system 802 to operate as described with respect to the various operational scenarios, sequences, and processes illustrated herein. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to support binary convolution operations. Indeed, encoding software 805 (and calibration process 808) on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary, etc.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A processing device comprising:
   transceiver circuitry configured to transmit and receive radar signals;
   processing circuitry coupled with the transceiver circuitry and configured to:
      generate, based on the radar signals, point cloud data associated with a scene;
      obtain a radar-space region of interest (ROI), wherein the radar-space ROI is based on a two-dimensional (2D) to three-dimensional (3D) coordinate map that relates image data to the point cloud data;
      identify a location of an object moving in the scene based at least on a received radar signal of the radar signals; and
      determine to wake-up a camera based on the location of the object in the scene and the radar-space ROI.

2. The processing device of claim 1 further comprising interface circuitry coupled with the processing circuitry and host circuitry, wherein the interface circuitry is configured to provide an interface between the processing circuitry and the host circuitry, and wherein the host circuitry is configured to control the camera.

3. The processing device of claim 2 wherein, to wake-up the camera, the processing circuitry is configured to communicate a wake-up signal to the host circuitry via the interface circuitry, wherein the host circuitry wakes up the camera in response to the wake-up signal and instructs the camera to capture one or more images of the scene.

4. The processing device of claim 2 wherein, to obtain the radar-space ROI, the processing circuitry is configured to provide the point cloud data to the host circuitry and receive the radar-space ROI from the host circuitry.

5. The processing device of claim 3 wherein the radar-space ROI comprises a forward distance boundary indicative of a forward distance in a real-world coordinate plane.

6. The processing device of claim 5 wherein, to determine to wake-up the camera based on the location of the object in the scene and the radar-space ROI, the processing circuitry is configured to determine that the location is within the forward distance boundary.

7. The processing device of claim 1 wherein, to generate the point cloud data associated with the scene, the processing circuitry is configured to generate the point cloud data based on received radar signals corresponding to a person positioned in the scene for calibration purposes.

8. A computing apparatus comprising:
   one or more computer readable storage media; and
   program instructions stored on the one or more computer readable storage media that, when read and executed by one or more processors, direct the computing apparatus to at least:
      generate, based on received radar signals, point cloud data associated with a scene;
      obtain a radar-space region of interest (ROI), wherein the radar-space ROI is based on a two-dimensional (2D) to three-dimensional (3D) coordinate map that relates image data to the point cloud data;
      identify a location of an object moving in the scene based at least on a received radar signal of the radar signals; and
      determine to wake-up a camera based on the location of the object in the scene and the radar-space ROI.

9. The computing apparatus of claim 8 wherein, to wake-up the camera, the program instructions further direct the computing apparatus to communicate a wake-up signal to a host, wherein the host wakes up the camera in response to the wake-up signal and instructs the camera to capture one or more images of the scene.

10. The computing apparatus of claim 9 wherein, to obtain the radar-space ROI, the program instructions direct the computing apparatus to provide the point cloud data to the host and receive the radar-space ROI from the host.

11. The computing apparatus of claim 10 wherein the radar-space ROI comprises a forward distance boundary indicative of a forward distance in a real-world coordinate plane.

12. The computing apparatus of claim 11 wherein, to determine to wake-up the camera based on the location of the object in the scene and the radar-space ROI, the program instructions direct the computing apparatus to determine that the location is within the forward distance boundary.

13. The computing apparatus of claim 8 wherein, to generate the point cloud data associated with the scene, the program instructions direct the computing apparatus to generate the point cloud data based on received radar signals corresponding to a person positioned in the scene for calibration purposes.

14. A method for detecting motion in a scene, the method comprising:
   identifying an image plane region of interest (ROI) associated with a camera;
   transforming the image plane ROI to a radar-space ROI;
   extracting motion information from a received radar signal, wherein the motion comprises a location of an object in-motion in the scene;
   performing a comparison of the location of the object in-motion in the scene to the radar-space ROI; and
   determining to wake-up the camera based on a result of the comparison.

15. A system comprising:
   host processing circuitry configured to control a camera;
   radar processing circuitry coupled with the host processing circuitry and configured to:
      generate, based on received radar signals, point cloud data associated with a scene;
      obtain a radar-space region of interest (ROI), wherein the radar-space ROI is based on a two-dimensional (2D) to three-dimensional (3D) coordinate map that relates image data to the point cloud data;
      identify a location of an object moving in the scene based at least on a received radar signal of the radar signals; and
      determine to wake-up the camera based on the location of the object in the scene and the radar-space ROI.

16. The system of claim 15 wherein, to wake-up the camera, the radar processing circuitry is configured to communicate a wake-up signal to the host processing circuitry, wherein the host processing circuitry wakes up the camera in response to the wake-up signal and instructs the camera to capture one or more images of the scene.

17. The system of claim 16 wherein, to obtain the radar-space ROI, the radar processing circuitry is configured to provide the point cloud data to the host processing circuitry and receive the radar-space ROI from the host processing circuitry.

18. The system of claim 17 wherein the radar-space ROI comprises a forward distance boundary indicative of a forward distance in a real-world coordinate plane.

19. The system of claim 18 wherein, to determine to wake-up the camera based on the location of the object in the scene and the radar-space ROI, the radar processing circuitry is configured to determine that the location is within the forward distance boundary.

20. The system of claim 15 wherein, to generate the point cloud data associated with the scene, the radar processing circuitry is configured to generate the point cloud data based on received radar signals corresponding to a person positioned in the scene for calibration purposes.

* * * * *